INVENTOR
Joseph M. Schaeffer
BY Rockwell & Bartholow
ATTORNEYS

Jan. 17, 1956  J. M. SCHAEFFER  2,730,731
CUT-OFF MECHANISM FOR HEADERS OR LIKE MACHINES
Filed April 30, 1953  4 Sheets-Sheet 3

INVENTOR
Joseph M. Schaeffer
Rockwell Bartholow
ATTORNEYS

Jan. 17, 1956 J. M. SCHAEFFER 2,730,731
CUT-OFF MECHANISM FOR HEADERS OR LIKE MACHINES
Filed April 30, 1953 4 Sheets-Sheet 4

INVENTOR
Joseph W. Schaeffer
BY Rockwell Bartholow
ATTORNEYS

United States Patent Office 2,730,731
Patented Jan. 17, 1956

2,730,731
CUT-OFF MECHANISM FOR HEADERS OR LIKE MACHINES

Joseph M. Schaeffer, Waterbury, Conn., assignor to The Waterbury Farrel Foundry & Machine Company, Waterbury, Conn., a corporation of Connecticut Application April 30, 1953, Serial No. 352,173

9 Claims. (Cl. 10—25)

This invention relates to metal-processing machines such as headers or nut or bolt formers, for example, wherein wire or rod stock to be processed is fed into the machine and cut into workpieces or blanks of suitable length for processing. The invention involves the cut-off mechanism of such a machine and contemplates the provision of actuating mechanism for the cutter bar so that the stroke of the latter may be accurately regulated to cut a workpiece or blank from the wire or rod stock and move it to a position in front of a processing die.

As illustrated, the invention is applied to a nut former or similar machine wherein a plurality of dies including a cut-off die are mounted in a die bed, and suitable tools or punches are carried by a movable gate adapted to be advanced toward the bed. The wire or rod stock is fed to the machine by suitable mechanism which effects a step-by-step feed of the stock to provide a blank or workpiece of predetermined length for each operation, and the cutter bar is moved across the face of the cut-off die to sever the stock and to advance it to the first die station of the processing operation.

One object of the present invention is to provide an improved cut-off mechanism for a nut former, header or similar machine adapted to cut suitable blanks or workpieces from a length of wire or bar stock.

A still further object of the invention is to provide in a machine of the character described a cut-off mechanism in which the cutter bar will be actuated in a positive manner so as to have the exact length of stroke desired and at the same time it may be operated at relatively high speeds in order that the output of the machine will be as great as possible.

A still further object of the invention is to provide, in a machine of the character described, means for cutting a workpiece or blank of predetermined length from bar or rod stock wherein the mechanism for actuating the cutter bar will be strong and durable, capable of operation at high speeds, and easily and readily adjustable as to stroke so that the blank may be severed from the length of stock and advanced accurately to the first processing station.

A still further object of the invention is to provide a cut-off mechanism of the character described wherein relative movement is permitted between the cutter bar and the actuating mechanism therefor whereby the cutter bar upon its return or inoperative stroke may be brought up against a positive stop and the actuating mechanism permitted a further travel without moving the cutter bar.

To these and other ends the invention consists in the novel features and combinations of parts to be hereinafter described and claimed.

Figure 1:
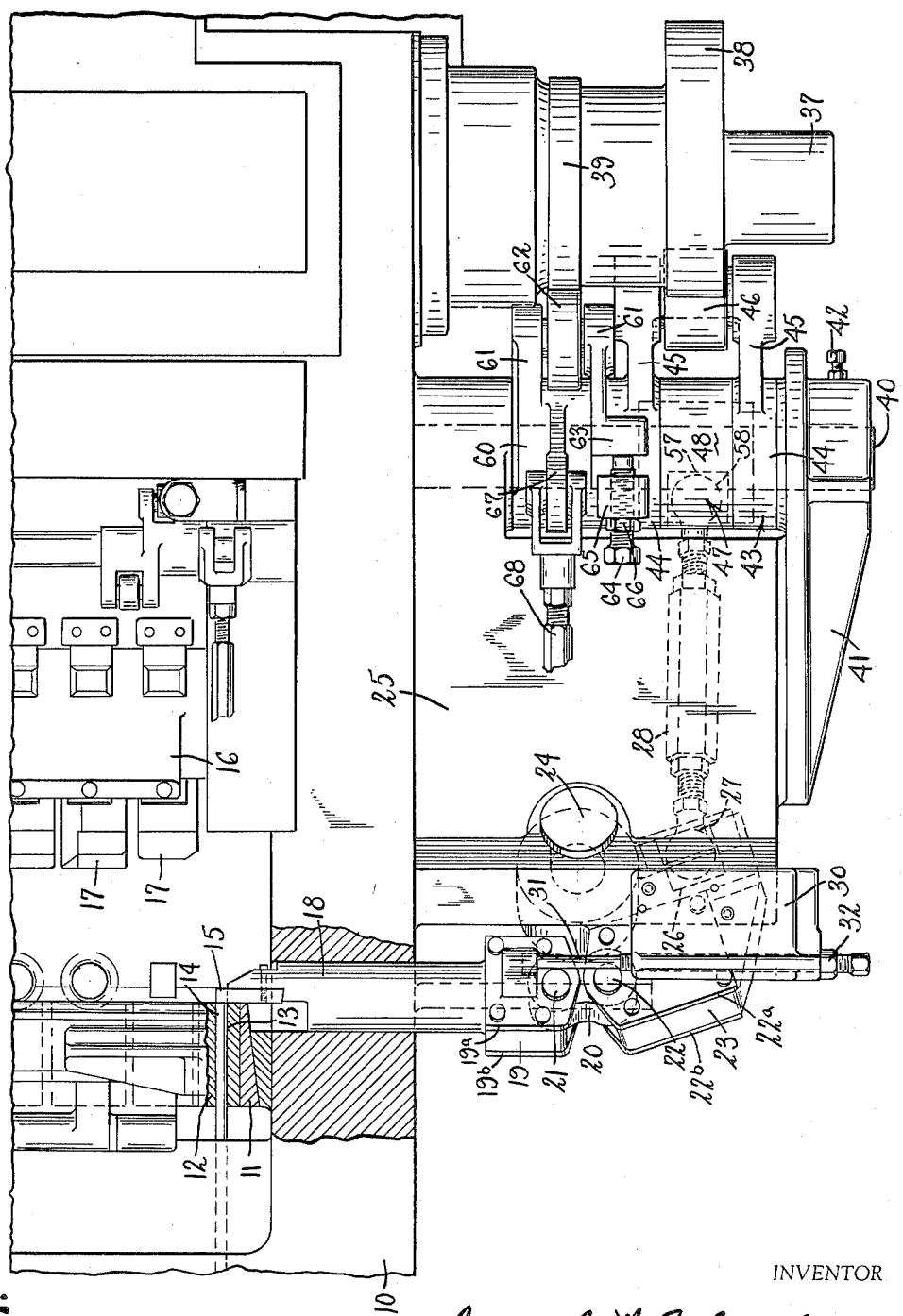
Fig. 1 is a top plan view of a portion of a nut former having my improved cut-off mechanism applied thereto.

To illustrate a preferred embodiment of my invention I have shown in Fig. 1 of the drawings a nut former comprising a main frame 10 having a die block 11 mounted thereon upon which are a plurality of processing dies (not shown) and a cut-off die 12. The latter is provided with an opening 13 through which may be fed a length of wire or rod stock 14 from which workpieces of suitable length may be cut by a cut-off member or knife 15, the latter being commonly provided with an opening through which the piece of stock 14 is fed.

It will be understood that the length of stock 14 may be fed forwardly in a step-by-step movement by any well-known mechanism provided for this purpose so that it is unnecessary to illustrate such mechanism herein. As shown in Fig. 1, the knife or cutter member 15 reciprocates across the face of the cut-off die so as to sever the workpiece from the length of stock and carry it to the first processing station.

A movable gate designated generally by the numeral 16 is provided in the frame, the gate being reciprocable toward and from the die block 11 by means well known to those skilled in the art. Carried upon the face of the gate are a plurality of tools 17 which cooperate with dies in the die block 11 to process the blank.

Reciprocably mounted in the frame 10 is a cutter bar 18 to which the cutter member 15 is secured. At the outer end of the cutter bar is provided a head 19 and a link 20 is pivoted at 21 to caps 19$^a$ and 19$^b$ secured to the head 19. The other end of this link is pivoted at 22 to caps 22$^a$ and 22$^b$ secured to a rocker block 23.

Figure 2:
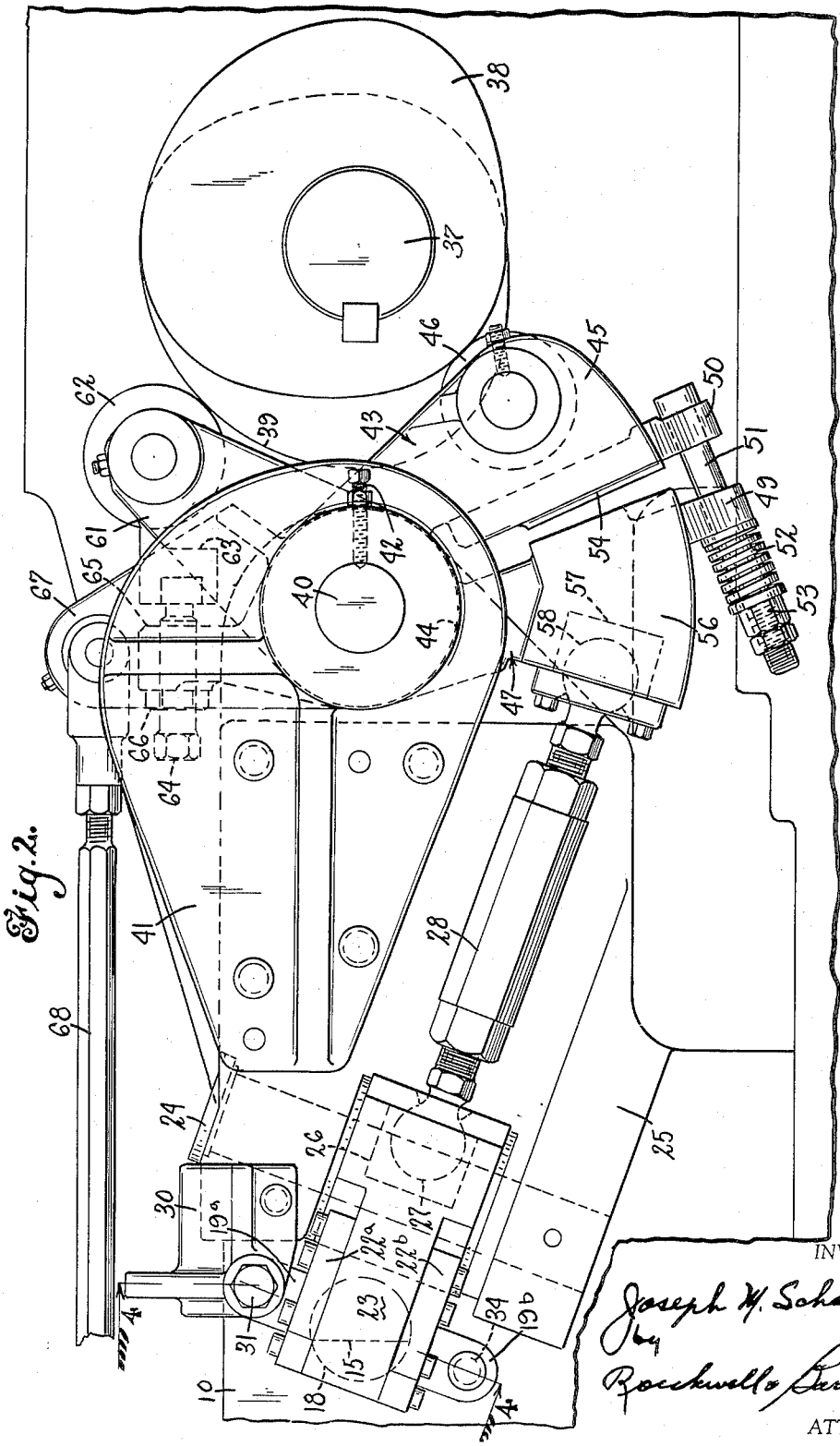
Fig. 2 is an enlarged side elevational view of the cut-off mechanism and actuating means therefor.

The rocker block is rockingly or pivotally mounted upon an inclined stub shaft 24, which shaft is journaled in a relatively heavy bracket member 25 formed integrally with the frame member 10 but projecting laterally therefrom, this bracket being shown more particularly in Figs. 1 and 2. Also as shown in Fig. 2, the rocker block 23, which is of angular shape, is provided at its rear end with a socket 26 to receive a ball member 27, which ball member is part of a turnbuckle structure 28. This provides a ball-and-socket connection between the rocker block and the member 28 so as to permit some relative angular movement therebetween and, as will be hereinafter explained, the member 28 serves to actuate or rock the block 23 about its axis 24 and thus through the link 20 effect reciprocation of the cutter bar 18.

Figure 3:
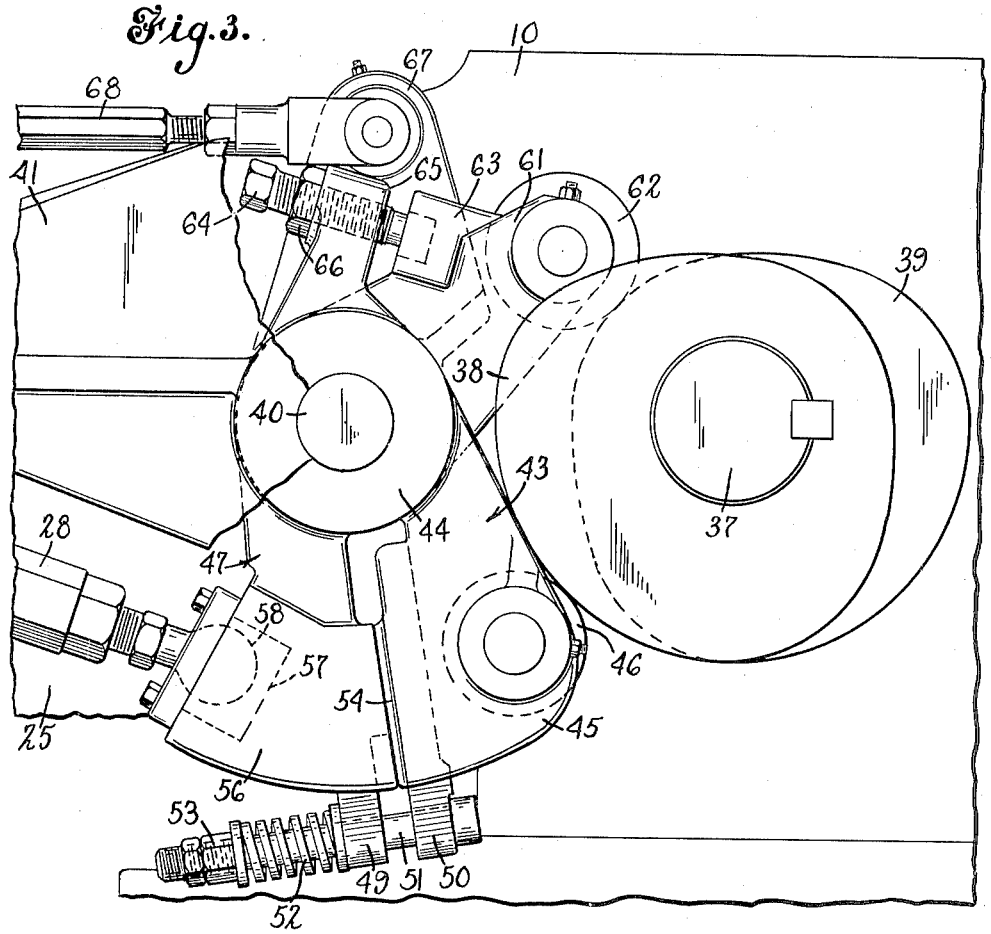
Fig. 3 is a view similar to Fig. 2 showing the parts in another position.
Figure 4:
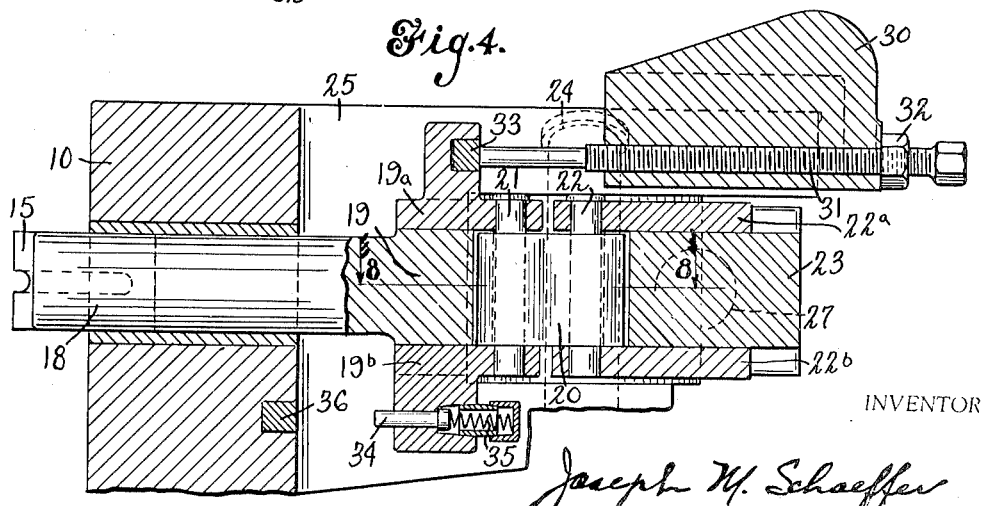
Fig. 4 is a sectional view on line 4—4 of Fig. 2.

Also secured to the heavy bracket 25 is a lighter bracket 30 into which is threaded a stop pin 31 held in the desired adjusted position by the lock nut 32. The inner end of this pin is adapted to engage a hardened insert or block 33 carried by the cap 19$^a$ on the head 19 of the cutter bar 18 so that the rearward or back stroke of the cutter bar (the stroke toward the right, as shown in Figs. 3 and 4) will be accurately limited in order to bring the opening in the cutter member 15 accurately over the opening in the cut-off die so that the stock will be fed through the opening in the cutter. Also, as shown in Fig. 4, a stop pin 34 is slidably carried by the cap 19$^b$ and urged outwardly or toward the left by the spring 35 so that upon the advance stroke or operative stroke of the cutter bar, the projecting end of this pin will engage the hardened block 36 provided in the frame 10 and will take out any play or over-travel in the mechanism as adjusted by the turnbuckle 28.

The mechanism of the device includes a transversely extending crankshaft 37, and secured to this shaft are a cam 38 for advancing the cutter and a cam 39 which, as will be later explained, serves the double purpose of actuating the transfer mechanism for the machine and serves as the follower cam to effect the return or inoperative stroke of the cutter.

Figure 6:
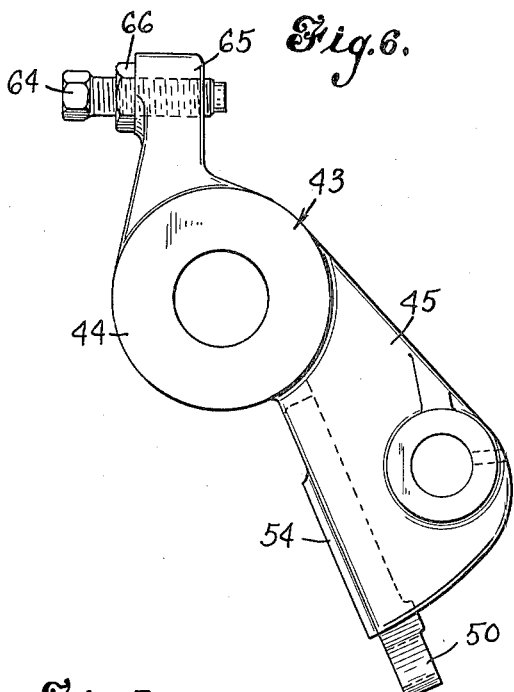

Secured in the bracket 25 is a shaft 40, this shaft being held in place by a cap 41 secured at the side of the bracket to which the shaft is secured by a set screw 42. Rotatably mounted on this shaft is the lever member shown in Fig. 6 designated generally by the numeral 43. This member comprises a pair of spaced journals or bearings 44 from each of which depends an arm 45 (Figs. 1 and 6). A roller 46 is rotatably carried by the spaced arms 45, which roller is in engagement with the surface of the cut-off cam 38 which advances the cutter bar.

Figure 5:
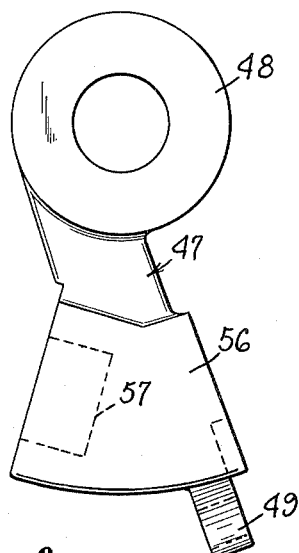
Figs. 5, 6 and 7 are detail views of certain elements of the actuating mechanism for the cutter bar.

Rockably mounted upon the shaft 40 between the bearings 44 of the lever member 43 is the arm 47, illustrated in Fig. 5. This arm is provided with the journal 48 which lies between the journals 44 and receives the shaft 40, and at its lower end is provided with an eye member 49 which registers with a similar member 50 on the lower end of the arms 45 of the lever 43. A pin 51 (Figs. 2 and 3) is inserted through these eye members, and a spring 52 provided between the member 49 and the nut 53 threaded on the pin 51 tends to urge the eye members 49 and 50 and, therefore, the arms 45 and 47 toward each other. The member 43 may be provided with a pad 54 to engage the adjacent surface of the arm 47.

The arm 47 is also provided with a block 56 provided with a socket 57 to receive the ball member 58 upon the lower or rear end of the turnbuckle mechanism 28 so that the latter is operated by the movement of the arm 47.

With the above construction it will be obvious that as the roller 46 follows the cut-off cam 38, the lever 43 will be advanced or moved in a clockwise direction and close the gap between the lever 43 and arm 47, as shown in Fig. 3, and the turnbuckle structure will be moved toward the left, as shown in Figs. 2 and 3, thus rocking the block 23 about its pivot 24 and advancing the cutter bar 18 across the die 12. This movement of the cutter bar will sever a blank or workpiece from the length of stock and advance it to one of the processing stations of the machine. The range of movement of the cutter bar may be adjusted by adjustment of the turnbuckle 28, which, of course, also adjusts the final position thereof. Any play which may exist in the mechanism will be taken up by the buffer pin 34.

It is desirable to provide for an accurate initial positioning of the cutter member 15 in order that a length of stock can be fed through an opening commonly provided in this cutter. As has been stated, the return stroke of the cutter bar is limited by the engagement of the stop pin 31 which is secured in the frame with the member 33 carried by the head of the cutter bar so that the return of the latter will be definitely limited. It is, therefore, necessary to provide some lost motion or play in the mechanism for effecting the return stroke of the cutting bar which will now be described.

Figures 7, 8:
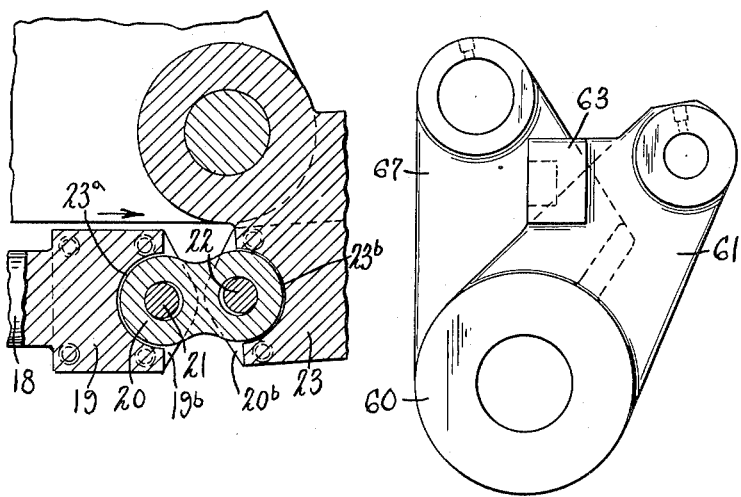
Fig. 8 is a sectional view on line 8—8 of Fig. 4.

As shown in Figs. 1 and 2, 7 and 3, a bell crank lever, shown in Fig. 7, is rockably mounted upon the shaft 40, this lever being provided with a journal or bearing 60 to receive this shaft. This member is provided with a pair of parallel spaced arms 61 (Fig. 1) which carry a roller 62 serving as a follower and engaging the return cam 39 so that rotation of the cam will serve to move the bell crank lever in a counter-clockwise direction, as shown in Figs. 2 and 3.

The arm 61 of this bell crank lever which is nearest the lever 43 is provided with a lug 63 adapted to be engaged by a stud 64 threaded in an upwardly projecting arm 65 of the lever 43 (Fig. 6). This stud 64 may be threadedly adjusted with respect to the arm 65 and held in place by the lock nut 66.

With this construction it will be seen that when the arms 61 of the bell crank mechanism are moved in a counterclockwise direction by the cam 39, the engagement between the block 63 and the stud 64 will result in movement of the lever 43 in a counter-clockwise direction. This movement of the lever 43 will, by means of the connecting pin 51 and spring 52, also move arm 47 in a counter-clockwise direction and thus effect a return stroke of the cutter bar. If, due to adjustment of the parts of the mechanism, the return movement of the cutter bar is halted by the stop pin 31 prior to the termination of the movement of the roller 62 by the cam 39, the latter movement will continue and will merely result in compression of the spring 52 which allows separation of the members 43 and 47, as shown in Fig. 2. Thus the return movement of the cutter bar may be definitely limited while permitting over-travel of the lever 43 due to the action of the follower or return cam 39.

The bell crank lever, shown in Fig. 7, is also provided with an arm 67 to the upper end of which is connected one end of a link 68, the other end of which may be connected to suitable transfer mechanism (not shown) so that the transfer mechanism may be operated by the same cam which effects the return of the cutter bar.

It may be noted from Fig. 8 of the drawings that the link 20 is provided with a half-round shape at each end, and one end of this link seats snugly in a complementary recess 23ª in the head 19 of the cutter bar while the other end of the link seats in a similar recess 23ᵇ in the rocker block 23. It may also be noted that the pivot pins 21 and 22 have a slight play in the openings of the link through which they extend. With this construction, upon movement of the rocker block 23 in a direction to operate the cutter bar to sever a workpiece, the link, by engaging in the half-round seats of the members 19 and 23, will take up and withstand the bearing thrust, relieving the pins 21 and 22 of this work. On the return movement of the rocker block 23, the pins will draw the cutter bar in the reverse direction.

While I have shown and described a preferred embodiment of my invention, it will be understood that it is not to be limited to all of the details shown, but is capable of modification and variation within the spirit of the invention and within the scope of the claims.

What I claim is:

1. In a metal-blank-processing machine having a die block and a cutter bar mounted to reciprocate over a path substantially parallel to the face of the die block, cam means for imparting movement to the cutter bar and connections between said cam means and the cutter bar comprising a rock lever moved by said cam means, a member pivoted coincidentally with said lever and connected to the cutter bar against which said lever is adapted to abut, and spring means urging said lever toward said member but permitting limited separation of the lever therefrom.

2. In a metal-blank-processing machine having a die block and a cutter bar mounted to reciprocate over a path substantially parallel to the face of the die block, cam means for imparting movement to the cutter bar and connections between said cam means and the cutter bar comprising a rock lever moved by said cam means, a member coincidentally pivoted with the rock lever and connected to the cutter bar against which said lever is adapted to abut, spring means urging said lever toward said member but permitting limited separation of the lever therefrom, and a stop member to engage a part of the cutter bar and limit the stroke thereof in one direction.

3. In a metal-blank-processing machine having a die block and a cutter bar mounted to reciprocate over a path substantially parallel to the face of the die block, means for imparting movement to the cutter bar comprising a rock lever, an arm pivoted adjacent the lever and connected to the cutter bar, said lever and arm having abutting surfaces whereby actuation of the rock lever in one direction effects engagement of said surfaces and moves said arm to advance the cutter bar, means for actuating said rock lever in opposite directions, and a yielding connecting means between said lever and arm to move said latter in the other direction to effect return movement of the cutter bar.

4. A mechanism as in claim 3 wherein a stop is provided to limit return movement of the cutter bar, and said yielding connecting means between the lever and arm permits separation thereof upon engagement of said stop.

5. A mechanism as in claim 3 wherein a stop is provided to engage a part of the cutter bar and limit return movement thereof, and said yielding connecting means between said lever and arm permits separation thereof to provide for over-travel of the rock lever upon limitation of the return movement of the cutter bar by said stop.

6. In a metal-blank-processing machine having a die block and a cutter bar mounted to reciprocate over a path substantially parallel to the face of the die block, means for imparting movement to the cutter bar comprising a pair of coincidentally pivoted members, the surface of one being adapted to abut the other, one of said members being connected to the cutter bar, cam means for actuating the other of said members, means loosely connecting said members to permit limited separation thereof, and spring means urging said members into abutting relation.

7. In a metal-blank-processing machine having a die block and a cutter bar mounted to reciprocate over a path substantially parallel to the face of the block to cut a blank from a piece of stock and return to its original position, cam means for imparting movement to the cutter bar and connections between said cam means and the cutter bar comprising an arm member pivoted on the frame and connected to the cutter bar, a lever pivoted on the frame having a follower engaging said cam means, said lever having a portion adapted to abut and move said arm when the lever is moved in a cutting direction, and a yielding connection between said arm and lever to resist separation thereof when the lever is moved in the return direction.

8. In a metal-blank-processing machine having a die block and a cutter bar mounted to reciprocate over a path substantially parallel to the face of the die block to cut a blank from a piece of stock and return to its original position, means for imparting movement to the cutter bar comprising an arm member pivoted on the frame and connected to the cutter bar, a lever member pivoted on the frame having a portion adapted to abut against and move said arm when the lever is moved in a cutting direction, means yieldingly connecting said members to move said arm when the lever is moved in the return direction, and cam means to move said lever in both directions.

9. In a metal-blank-processing machine having a die block and a cutter bar mounted to reciprocate over a path substantially parallel to the face of the die block to cut a blank from a piece of stock and return to its original position, means for imparting movement to the cutter bar comprising an arm member pivoted on the frame and connected to the cutter bar, a lever member pivoted on the frame having a portion adapted to abut against and move said arm when the lever is moved in a cutting direction, means yieldingly connecting said members to move said arm when the lever is moved in the return direction, cam means, said lever having a follower engaged with said cam means to move the lever in said cutting direction, and a third member pivoted to the frame and engaged with said cam means and also engaging said lever to move the latter in the return direction.

References Cited in the file of this patent

UNITED STATES PATENTS

| | | |
|---|---|---|
| 1,592,060 | Wilcox | July 13, 1926 |
| 1,897,359 | Brennan | Feb. 14, 1933 |